INVENTORS
Richard W. Hyde
Stanley V. Margolin
BY
Attorney

June 22, 1971
R. W. HYDE ET AL  3,586,481
METHOD FOR EXTRACTING PURE ALPHA-ALUMINA FROM CLAYS
Filed Oct. 16, 1968  4 Sheets-Sheet 3

INVENTORS
Richard W. Hyde
BY Stanley V. Margolin

Attorney

United States Patent Office 3,586,481
Patented June 22, 1971

3,586,481
METHOD FOR EXTRACTING PURE
ALPHA-ALUMINA FROM CLAYS
Richard W. Hyde, Lexington, and Stanley V. Margolin,
Auburndale, Mass., assignors to Arthur D. Little Inc.,
Cambridge, Mass.
Filed Oct. 16, 1968, Ser. No. 768,112
Int. Cl. C01f 7/02
U.S. Cl. 23—141                                    13 Claims

ABSTRACT OF THE DISCLOSURE

A method for converting the aluminum contained in clays to $\alpha$-alumina which is of sufficient purity to permit its direct reduction to aluminum metal in a Hall electrolytic cell. The method includes calcining the aluminum-containing clay leaching the calcined clay with aqueous nitric acid, flocculating the insoluble impurities to aid in their separation by settling and filtration, contacting the filtrate with an ion-exchange liquid to remove the soluble ferric iron along with other metallic impurities, introducing the substantially pure aluminum nitrate solution into a fluidized bed of the product alumina maintained at a temperature preferably between about 200 and 210° C., and having a fluidizing gas containing a controlled amount of water vapor to hydrolyze the aluminum nitrate, thus making it possible to remove about 90 to 95% of the nitrate as nitric acid vapor, and finally heating the hydrolyzed dry product from the fluidized bed to drive off the remaining nitrate as oxides of nitrogen, and converting these solids to $\alpha$-alumina.

CROSS-REFERENCES TO RELATED APPLICATIONS

There are three co-pending applications assigned to the same assignee at the present application which are directly related to the method described in this present application. These co-pending applications are Ser. No. 768,180 filed Oct. 16, 1968 in the name of Harold W. Flood for "Ion-Exchange Liquid and Method of Using It To Remove Ferric Iron From Aqueous Solutions of Aluminum Salts"; Ser. No. 768,033 filed Oct. 16, 1968 in the name of Heinz P. Beutner and Paul A. Huska for "Method for Stripping Ions From an Ion-Exchange Liquid"; and Ser. No. 768,111 filed Oct. 16, 1968 in the names of Paul A. Huska, Herman P. Meissner and Thomas J. Lamb for "Method and Apparatus for Converting Aluminum Nitrate Solutions to Alpha-Alumina."

This invention relates to a method for obtaining high purity $\alpha$-alumina from aluminum-bearing clays.

The present source of $\alpha$-alumina is bauxite; and despite extensive study, no commercially successful process based upon clay as a source has as yet been developed even though many clays have a relatively high alumina content.

The method of this invention is directed to an overall economical process for extracting aluminum from clays and as such it represents an improvement over U.S. Pat. 3,211,524 which is concerned with the removal of aluminum from clays by nitric acid extraction. It has now been found that by accurately controlling the temperature of the various steps and by hydrolyzing rather than decomposing the aluminum nitrate solution which results from leaching the clay, it is possible to recover from 90–95% of the nitrate in the leach liquor in the form of nitric acid rather than the oxides of nitrogen as is done in U.S. Pat. 3,211,524. Moreover, it has been found that by proper treatment of the ion-exchange liquid which is employed to remove the soluble iron from the aluminum nitrate that this ion-exchange liquid can be recycled without experiencing any thermal degradation or without the build-up within the system of any corrosive reactive materials.

It is therefore a primary object of this invention to provide an improved method for extracting alumina from clays, the method being one which is more economical to practice than heretofore possible. It is another object of this invention to provide such a method which permits the recovery of nitrate values from a leach liquor primarily in the form of nitric acid rather than as nitrogen oxides, which in turn eliminates the necessity for reconstituting nitric acid from these oxides. It is another primary object of this invention to provide a flexible method for extracting impurities from the leach liquor containing dissolved aluminum so that the final product of the process meets the exacting purity specifications for alumina of the aluminum industry.

It is yet another object of this invention to provide a completely closed, continuous system for processing aluminum-bearing clays to form $\alpha$-alumina of a purity sufficient to permit its direct introduction into an electrolytic cell for reduction to aluminum metal. Other objects of the invention will in part be obvious and will in part be apparent hereinafter.

The invention accordingly comprises the several steps and the relation of one or more steps with respect to each of the others thereof which will be exemplified in the method hereinafter disclosed, and the scope of the invention will be indicated in the claims.

For a fuller understanding of the nature and objects of the invention, reference should be had to the following detailed description taken in accordance with the accompanying drawings in which FIG. 1 is a flow diagram showing the method of this invention;

Figure 7:
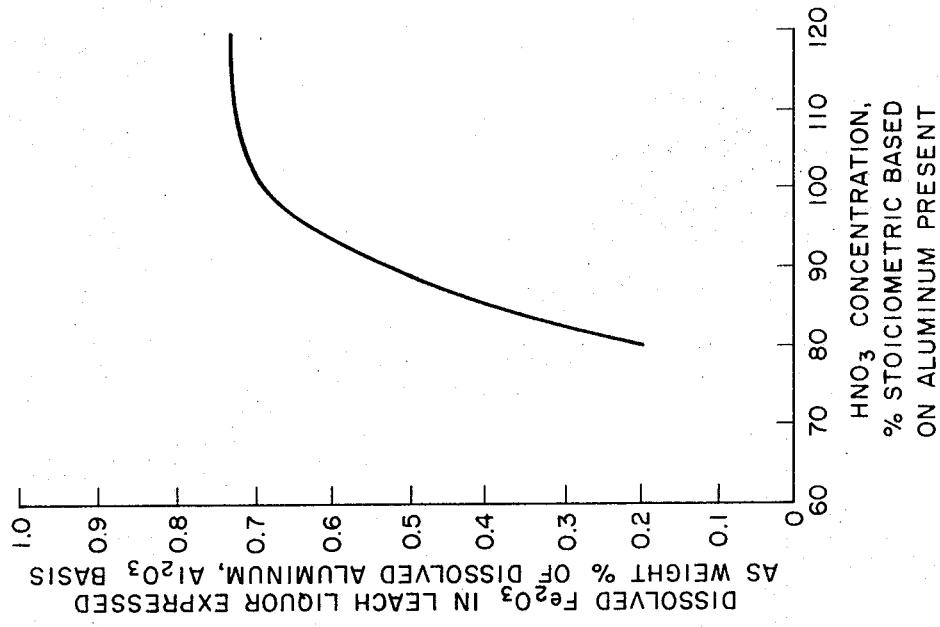
Figure 6:
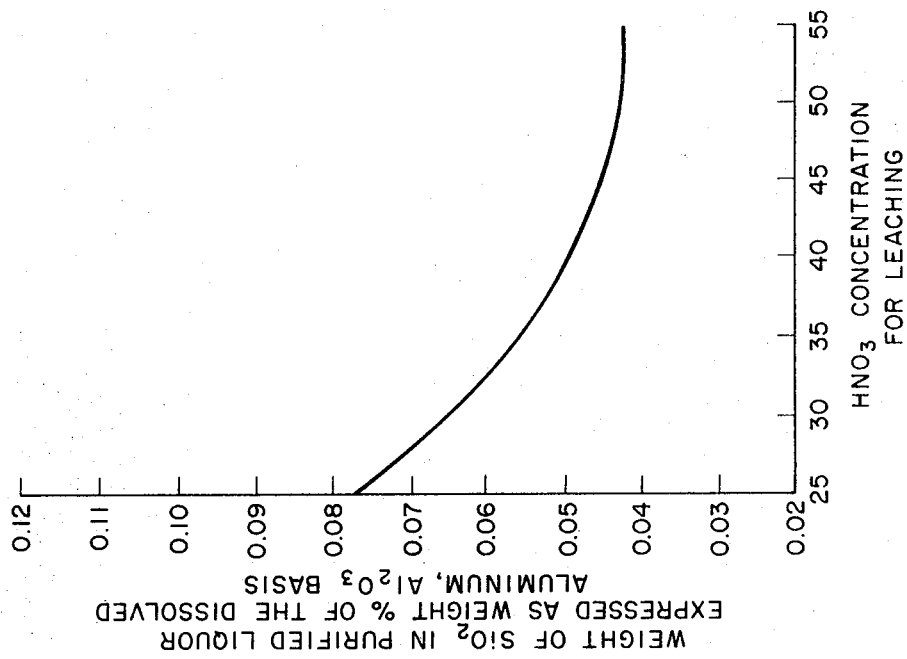

FIG. 6 is a plot of the amount of dissolved $SiO_2$ remaining in the leach liquor expressed as weight percent of the dissolved aluminum, $Al_2O_3$ basis, as a function of the $HNO_3$ concentration used in leaching; and FIG. 7 is a plot of the amount of dissolved $Fe_2O_3$ remaining in the leach liquor expressed as weight percent of the dissolved aluminum, $Al_2O_3$ basis, as a function of the amount of $HNO_3$ used in leaching based upon the amount of aluminum in the clay.

Figure 1:
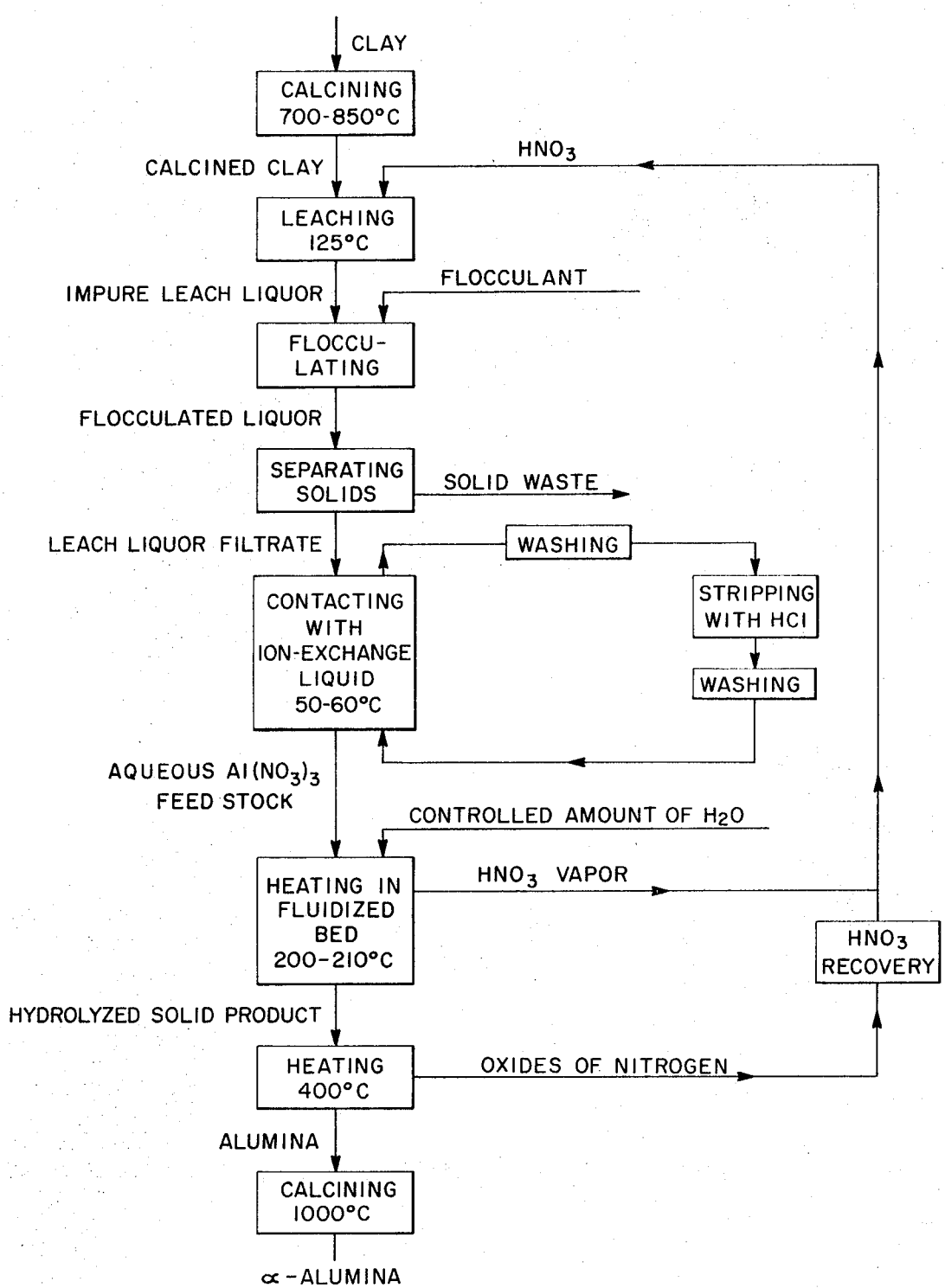

The method of this invention may be, as illustrated in FIG. 1, described in terms of a series of separate steps, all of which are, however, integrated to form the overall method for converting the clay to alumina.

Calcining

The purpose of the calcining step is, of course, to break the alumino-silicate bonds in such a way as to make the aluminum portions soluble in the nitric acid. In calcining, the water of crystallization is lost from the kaolin lattice and the alumino-silicate structure which remains undergoes a transformation whinh reorders the aluminum and its associated oxygen atoms from their original regular site in the lattice to an amorphous alumina, leaving behind a skeleton of crystalline silica. The amorphous alumina readily dissolves in the nitric acid leaving behind the insoluble crystalline silica which may be removed as a solid waste product. Calcination is preferably carried out between a temperature of about 700–850° C. for a time sufficient to bring about the transformation described above. If the calcination temperature is too high, or is carried out for too long a period, the amorphous alumina will begin to recrystallize into the gamma-alumina form and then react with the silica to form mullite. Both of the latter forms are insoluble in nitric acid and are to be avoided in the calcining step. Generally calcining may be carried out over a period from one to three hours, and may be achieved in such apparatus as a fluidized bed (see for example U.S. Pat. 2,711,368), or in other gas-solid contacting equipment which permits the requisite temperature control, such as a rotary kiln or a shaft kiln.

Leaching

In leaching it is, of course, desirable to extract the maximum amount of aluminum while dissolving the minimum amount of nonaluminum elements contained in the clay (special attention being given to those elements which are most difficult to remove from the aluminum nitrate solution) and to produce a leach slurry from which the insoluble solid residue may be easily separated. We have found that these desiderata are obtained by a combination of operating parameters which include temperature, leaching time, residence time in the fluid bed, nitric acid concentration and the stoichiometry of the system.

Primary attention must be paid to the amount of silica and ferric iron which remains in the alumina after it is calcined, i.e., in the α-alumina which is to be used in the electrolytic cell.

Figure 3:
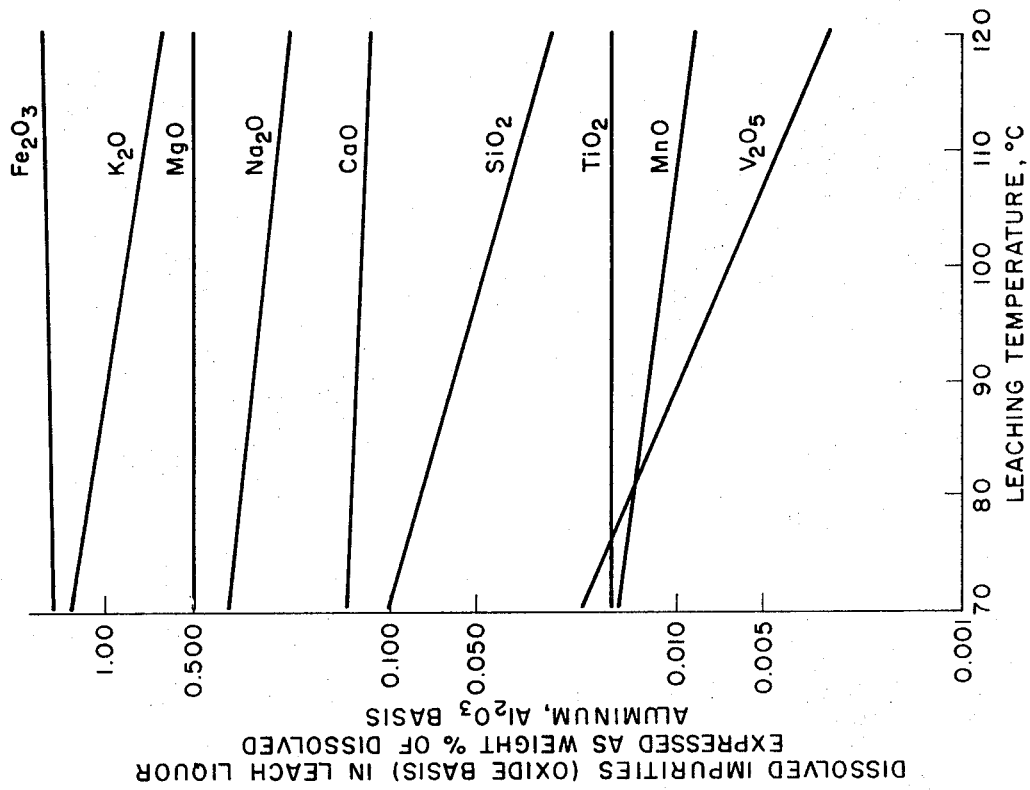
FIGS. 2 and 3 are plots showing the amounts of dissolved oxide impurities remaining in the leach liquor expressed as weight percents of the dissolved aluminum, $Al_2O_3$ basis, as a function of leaching temperature.
Figure 2:
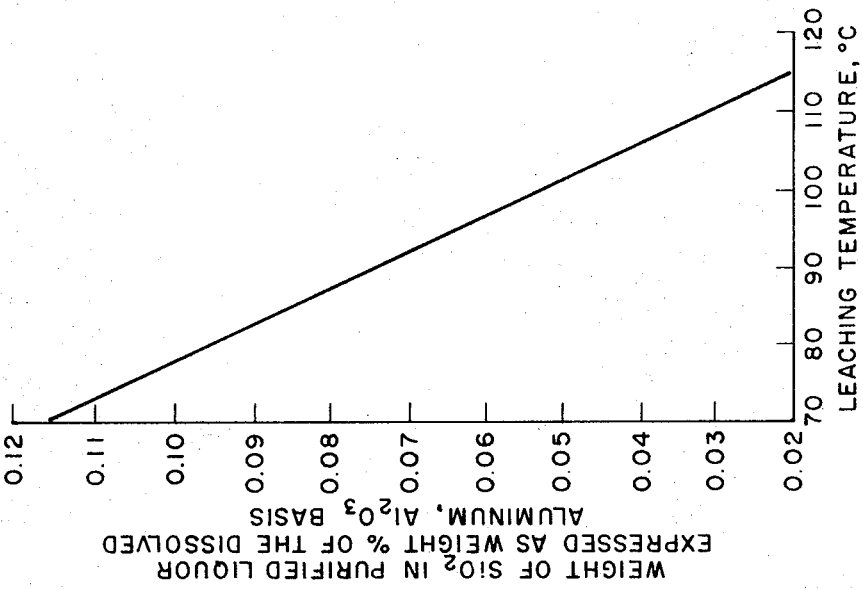

Reference to FIGS. 2 and 3 will show that the leaching temperature has an important influence upon the amount of silica which remains in the finally calcined alumina, while it affects the quantity of ferric iron only slightly. Since the amount of silica which remains in the alumina decreases materially with increasing temperature (FIG. 2), while the amount of ferric iron increases only slightly, it is advantageous to carry out leaching at the highest possible temperature which is compatible with all other operating conditions, including leaching time, acid concentration and molar ratio of nitric acid to the alumina present. It is therefore preferable that the leaching step be carried out at a temperature which is essentially equivalent to the atmospheric boiling temperature of the solution to minimize impurity dissolution, i.e., over a range from about 100 to 145° C. and preferably at about 125° C. Normally, practical considerations such as apparatus construction and cost make it preferable to perform the leaching at or near atmospheric pressure. However, pressures above atmospheric may be used and the leaching carried out at somewhat higher temperatures.

Figure 5:
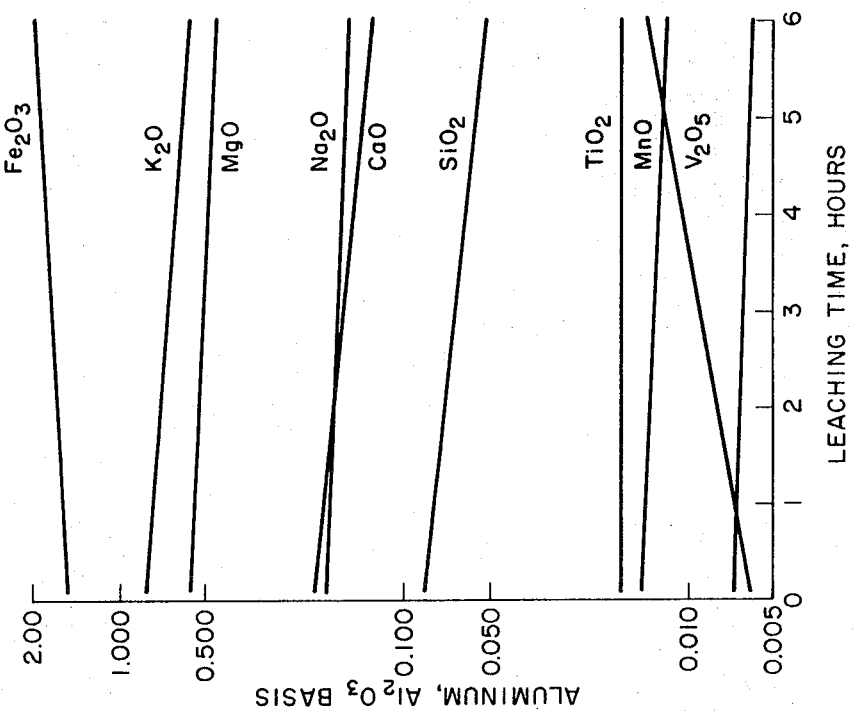
FIGS. 4 and 5 are plots showing the amounts of dissolved oxide impurities remaining in the leach liquor expressed as weight percents of the dissolved aluminum, $Al_2O_3$ basis, as a function of leaching time.
Figure 4:
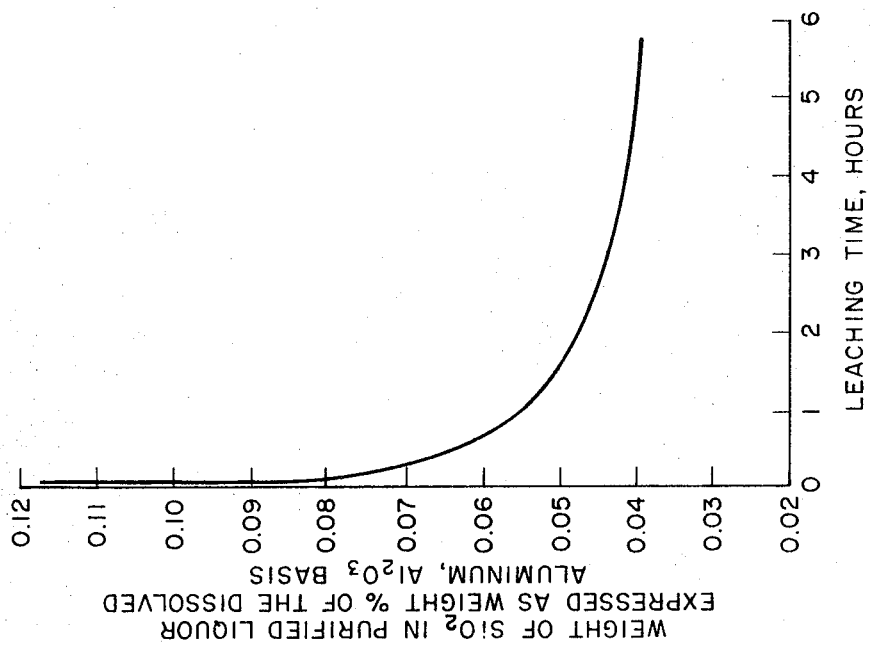

Reference to FIGS. 4 and 5, which illustrate the influence of leaching time upon the dissolved oxide impurity content in the leach liquor indicates that the amount of silica present in solution is high at first, but then drops off rapidly up to a leaching time of about three hours, while at the same time the amount of ferric iron which is dissolved increases only very little with increasing leaching time. It is therefore preferable in the method of this invention to leach for at least three hours. Any leaching time much over three hours does not contribute materially to the decreasing of the impurities in the calcined alumina.

A third operating parameter in the leaching step is the concentration of the nitric acid used in leaching. The effect of varying nitric acid concentration is plotted in FIG. 6, with the dissolved silica content in the leach liquor expressed as a percent of the dissolved aluminum, alumina basis, being the measurement of influence exercised by nitric acid concentration. These data show that the concentration of nitric acid should range between about 35 and 55 weight percent for the temperature and time specified above. The final parameter in the leaching step is the amount of nitric acid used and this is illustrated in FIG. 7, which is a plot of the amount of ferric iron dissolved in the leach liquor (expressed as a percent of the alumina) as a function of the stoichiometric percent of nitric acid based upon the aluminum present in the clay. It wil be seen from FIG. 7 that this amount of nitric acid should range between about 95 and 100% of the stoichiometric amount calculated.

The liquor obtained at the end of the leaching step is obviously impure, for it contains not only dissolved impurities but also suspended solid impurities which must be removed in a separating step.

Separating

In the separating step it is of course necessary to remove essentially all of the suspended solids from the impure leach liquor. This is preferably done by adding to the impure leach liquor a flocculant which will cause the suspended solids to agglomerate and to be more easily removed. Normally the solids content of the impure leach liquor will range from about 10 to 25 weight percent, this varying considerably for the type of clay used. A large number of commercially available flocculants are suitable for this purpose, the requirement being that they are capable of flocculating the solids in the highly acidic conditions prevailing in the impure leach liquor. As examples of suitable flocculants we may cite a cationic water-soluble polymer (solid by Hercules Incorporated as Reten 210), a nonionic water-soluble polyacrylamide (sold by the Dow Chemical Company as Separan NP20), and an anionic water-soluble polymer having a molecular weight greater than one million (sold by Naclo Chemical Company as Naclo 673).

Generally the amount of flocculant added to the impure leach liquor will not exceed about one percent by weight of the suspended solids present, although this again may vary over a wire range depending upon the quality of the solids which are to be flocculated.

Once the flocculant has caused the solid materials to settle, the solids may be removed from the liquid by means of any one or a combination of three classes of devices, namely, thickeners, centrifuges and filters. Again the choice will depend upon the type of material which is being handled. It has been found that flocculation and resulting separation of the solids from the liquid is much more easily performed when the leaching of the clay is performed at the required 125° C.

Removal of the solid waste material from the impure leach liquor leaves as a filtrate a leach liquor which is suitable for treatment to remove the dissolved metal impurities, the primary one being ferric iron. This is performed in the succeeding step.

Contacting with ion-exchange liquid

Removal of the ferric iron from the leach liquor along with other minor amounts of metallic impurities is preferably carried out by contacting the leach liquor with an ion-exchange liquid as is described in co-pending application Ser. No. 768,180 filed Oct. 16, 1968 in the name of Harold W. Flood and assigned to the same assignee as the present application. As described in the above-identified application, it is possible to remove the ferric iron along with calcium and magnesium ions by using an ion-exchange liquid which comprises a combination of di(2- ethylhexyl) hydrogen phosphate and tributyl phosphate dissolved in kerosene. The tributyl phosphate is apparently a synergist for the di(2-ethylhexyl) hydrogen phosphate and if desired it may be substituted by a high molecular weight oil-soluble, water-insoluble primary amine in the free-base form. Generally the ion exchange liquid will be formulated such that the concentration of the di(2-ethylhexyl) hydrogen phosphate may range from about 0.5 to 2 molar and the ratio of the di(2-ethylhexyl) hydrogen phosphate to tributyl phosphate (or other synergists) may range from about 5-to-1 to 100-to-1 with about 10-to-1 being preferred.

The step of contacting the aqueous aluminum nitrate leach liquor with the organic ion-exchange liquid may be accomplished by any manner known in the art for scrubbing a first liquid with a second immiscible liquid. Thus counter-current scrubbing towers may be used and the contacting step may be carried out once or may be repeated, depending upon the amount of ferric iron contained in the leach liquor and the amount that it is desirable to remove in the process. Other suitable extraction equipment which may be used include, but are not limited to, mixer settlers and centrifugal extractors.

The ratio of the volume of the aqueous phase leach liquor to the volume of the cation exchange liquid should range from about 2-to-1 to about 10-to-1, and the contacting preferably should be carried out at about 60° C. It is also preferable to maintain the concentration of the aluminum salt in the aqueous phase at no greater than about 55% by weight to prevent any thermal degradation of the ion-exchange liquid at elevated temperatures. It has been found that by using this particular ion-exchange liquid it is possible to remove essentially all of the ferric iron along with calcium, magnesium and phosphorus, while at the same time removing a minimum amount of the aluminum.

As described below in the step of recovering the ion-exchange liquid, it is possible to recycle this material without introducing into either the leach liquor or the ion-exchange liquid itself any undesirable products which might present difficulties in corrosion and handling.

The material which results from the contacting with the ion-exchange liquid is essentially a pure aluminum nitrate feedstock, the concentration of which may range up to saturation. This material is suitable for reduction to alumina and subsequent conversion to $\alpha$-alumina. This reduction and conversion is performed in two or more heating steps.

Heating in the fluidized bed

The first heaing step is carried in a fluidized bed and its purpose is to hydrolyze the pure aqueous aluminum nitrate feed stock in a manner to remove at least 90% of the nitrate values in the form of nitric acid vapor. In order to do this the fluidized bed must be maintained at a temperature such that the feed stock introduced onto the particles of the bed are substantially instantaneously raised to a temperature between about 150 and 350° C., with the preferred range being between about 200 and 210° C. It is also necessary that the gases in the fluidized bed contain a volume percent of water vapor ranging between about 25 and 45% and preferably at least 35%. If the aqueous feed stock does not possess sufficient water content to provide the required amount of water vapor in the fluidized bed gases, then the necessary additional water may be injected directly into the bed for conversion to water vapor or water may be injected into the hot combustion gases below the bed, or the additional water vapor may be introduced as a product of the combustion of air and fuel which is carried out to heat the bed particles. It is also, of course, within the scope of this invention to derive the necessary water vapor from two or more of these sources.

The nitric acid vapor is preferably withdrawn from the solids as rapidly as it is formed to minimize decomposition. In fluid bed operations this prompt wthdrawal occurs automatically in that the nitric acid vapors leave in the tail gases. Solid product may be withdrawn from the bed primarily in finely divided form suspended in the exit gases of the fluidized bed, it may be withdrawn on the surface particles removed through an overflow conduit from the bed, or in both of these forms. The product from the fluidized bed is a dry, hydrolyzed material typically containing from about 5 to 10% residual nitrate which must be further heated to form $\alpha$-alumina and to remove all of the residual nitrate as oxides of nitrogen.

Subsequent heating step or steps

The conversion of the hydrolyzed product withdrawn from the fluidized bed and removal of the residual nitrate is preferably carried out in a pebble heater. It is desirable that the pebbles be heated prior to contact with the solid dry fluidized bed product to prevent the dilution of the oxides of nitrogen with any combustion gases.

Although the subsequent heating steps required to remove the residual nitrate and then to calcine the alumina to form $\alpha$-alumina are preferably carried out as two distinct steps, the final heating of the fluidized bed product may be combined into one step which consists of heating the product to about 1,000° C. for a time sufficient to effect the nitrate removal and the calcining of the alumina.

If two final heating steps are employed then it is preferable to complete the decomposition and to remove the residual nitrate at a temperature of about 400° C., then preheat the resulting product and finally introduce it into suitable equipment such as a rotary kiln for calcining at about 1,000° C. until the conversion to $\alpha$-alumina is complete.

Removal and recycling

It is, of course, economically desirable to recycle both the ion-exchange liquid and the nitric acid which is removed directly as well as that which is formed by processing the oxides of nitrogen.

In a co-pending application Ser. No. 768,033 filed Oct. 16, 1968 in the names of Heinz P. Beutner and Paul A. Huska there is described a preferred method for stripping the ion-exchange liquid of the ferric iron (as well as of any other metallic impurities) prior to its recycling to contact the leaching liquor filtrate. The ion-exchange liquid tends to pick up small quantities of nitrate from the leach liquor filtrate and also to pick up small quantities of hydrochloric acid during the stripping of the iron from the ion-exchange liquid by hydrochloric acid. Thus a small quantity of nitrate can be introduced into the stripping liquid and a small quantity of chloride can be carried into the aluminum nitrate leach liquor to give rise to the formation of NOCl in the stripping liquid and in the leach liquor. In order to prevent the formation of any appreciable quantity of the very corrosive NOCl in either liquid, the ion-exchange liquid after it has picked up the iron and prior to its contact with the stripping HCl is washed with water. Likewise, after the ion-exchange liquid has been contacted with the stripping liquid HCl and the iron has been removed as $FeCl_3$, the stripping liquid is washed with water. By this method it is possible to continue to recycle the ion-exchange liquid without introducing any unwanted reaction products.

Recovery of the oxides of nitrogen and conversion to nitric acid is carried out by any well-known standard procedure. The nitric acid thus formed is then added to the condensed nitric vapor for recycling as illustrated in FIG. 1.

It will thus be seen from the above detailed description of the method of this invention that there is provided an improved process for recovering pure $\alpha$-alumina from clays, the process being one which is economical, relatively simple and provides for the ready handling of the various intermediate products. Thus up to the point of heating in a fluidized bed the material handled is a liquid; while beyond this point the material handled is a dry

We claim:
1. A method of recovering aluminum values from a clay, comprising the steps of
   (a) calcining aluminum-containing clay at a temperature and for a time sufficient to transform the alumino-silicate structure in said clay to an amorphous alumina while converting no appreciable amount of said amorphous alumina to γ-alumina;
   (b) leaching the resulting calcined clay with aqueous nitric acid of a concentration and at a temperature and for a time sufficient to reduce the $SiO_2$ content of the final alumina product below about 0.05 weight percent;
   (c) adding a flocculant to said impure leach liquor;
   (d) separating the suspended solids from the resulting flocculated impure leach liquor to leave a substantially solid-free impure leach liquor filtrate containing dissolved iron in the ferric state along with any other soluble metal impurities;
   (e) contacting said leach liquor filtrate with an ion-exchange liquid dissolved in an organic, essentially water-immiscible carrier thereby to transfer essentially all of said iron and said other metal impurities from said leach liquor filtrate to said ion-exchange liquid and to form an aqueous aluminum nitrate liquid feed stock, said contacting being carried out at a temperature below that at which said ion-exchange liquid experiences any appreciable thermal degradation;
   (f) introducing said liquid feed stock into a fluidized bed of α-alumina, wherein the particles in said fluidized bed are maintained at a temperature to substantially instantaneously raise the temperature of said liquid feed stock to between 200 and 210° C., and having a water vapor content in the gases above the bed to remove between about 90 and 95% of the nitrate in the feed stock as nitric acid vapor and to form a solid dry product containing a small amount of residual nitrate;
   (g) withdrawing said solid dry product from said fluidized bed;
   (h) heating said solid dry product to remove said residual nitrate primarily as oxides of nitrogen and to form alumina;
   (i) calcining said alumina thereby to convert it to α-alumina of sufficient purity to permit direct reduction to aluminum metal;
   (j) condensing said nitric acid vapor and converting said oxides of nitrogen to nitric acid for reuse in steps (b); and
   (k) stripping essentially all of said iron and said other residual metal impurities from said ion-exchange liquid for reuse of the ion-exchange liquid in step (e).

2. A method in accordance with claim 1 wherein said calcining in step (a) is carried out at a temperature between about 700 and 850° C.

3. A method in accordance with claim 1 wherein said leaching in step (b) is carried out at about 125° C. for from about one to three hours.

4. A method in accordance with claim 1 wherein said aqueous nitric acid for said leaching has a concentration of between about 35 and 55 weight percent and is added in an amount equivalent to between about 95 and 100% of the stoichiometric quantity based upon the aluminum present in said clay.

5. A method in accordance with claim 1 wherein said contacting in step (e) is accomplished at a temperature between about 50 and 60° C.

6. A method in accordance with claim 1 wherein said ion-exchange liquid comprises a mixture of di(2-ethylhexyl) hydrogen phosphate and a synergist therefor dissolved in kerosene.

7. A method in accordance with claim 6 wherein said synergist is tributyl phosphate.

8. A method in accordance with claim 1 wherein the volume ratio of said leach liquor filtrate to said ion-exchange liquid in step (e) ranges between 2-to-1 and 10-to-1.

9. A method in accordance with claim 1 wherein the said water vapor content in step (f) ranges between about 25 and 45% by volume.

10. A method in accordance with claim 1 wherein said heating in step (h) is carried out at a temperature of about 400° C.

11. A method in accordance with claim 1 wherein said heating step (h) and said calcining step (i) are combined.

12. A method in accordance with claim 1 wherein said stripping of said iron from said ion-exchange liquid in step (k) is effected by the steps of
   (1) washing the iron-loaded ion-exchange liquid with water thereby to remove residual nitrate picked up in step (e),
   (2) contacting the washed ion-exchange liquid with HCl thereby to remove substantially all of the iron, and
   (3) washing the substantially iron-free ion-exchange liquid with water to remove residual chloride ions thus preventing their introduction into said aqueous aluminum nitrate.

13. A method of recovering aluminum values from a clay, comprising the steps of
   (a) calcining aluminum-containing clay at a temperature between about 700 and 850° C. for a time sufficient to break the alumino-silicate bonding in said clay;
   (b) leaching the resulting calcined clay with aqueous nitric acid of a concentration ranging between 35 and 55 weight percent at a temperature of about 125° C. for about one to three hours, the quantity of said nitric acid being between 95–100% stoichiometric based upon the aluminum present in said clay, thereby to form an impure leach liquor;
   (c) adding a flocculant to said impure leach liquor;
   (d) separating the suspended solids from the resulting fluocculated impure leach liquor to leave an impure leach liquor filtrate containing dissolved iron in the ferric state along with any other soluble metal impurities;
   (e) contacting said leach liquor filtrate at a temperature between about 50 and 60° C. with an ion-exchange liquid comprising a mixture of di(2-ethylhexyl) hydrogen phosphate and a synergist therefor dissolved in an organic, essentially water-immiscible carrier thereby to transfer essentially all of said iron and said other metal impurities from said leach liquor filtrate to said iron-exchange liquid and to form an aqueous aluminum nitrate liquid feed stock;
   (f) introducing said liquid feed stock at about 60° C. into a fluidized bed maintained at a temperature between about 200 and 210° C. while maintaining the volume percent of water vapor in the gases above the bed between about 25 and 45% thereby to remove between about 90 and 95% of the nitrate in the feed stock as nitric acid vapor and to form a solid dry product containing residual nitrate;

(g) with drawing said solid dry product from said fluidized bed;

(h) heating said solid dry product to about 400° C. to remove said residual nitrate primarily as oxides of nitrogen and form alumina;

(i) calcining said alumina at about 1,000° C. thereby to convert it to $\alpha$-alumina of sufficient purity to permit direct reduction to aluminum metal;

(j) condensing said nitric acid vapor and converting said oxides of nitrogen to nitric acid for reuse in step (b); and (k) stripping essentially all of said iron and said other residual metal impurities from said ion-exchange liquid for reuse of the ion-exchange liquid in step (e).

References Cited
UNITED STATES PATENTS

| | | | |
|---|---|---|---|
| 2,127,504 | 8/1938 | Derr et al. | 23—143 |
| 3,211,521 | 10/1965 | George et al. | 23—143X |
| 3,211,524 | 10/1965 | Hyde et al. | 23—1X |
| 3,240,561 | 3/1966 | Brown | 23—143 |
| 3,240,562 | 3/1966 | Brown | 23—143 |
| 3,366,446 | 1/1968 | Kelly et al. | 23—143 |

EDWARD STERN, Primary Examiner

U.S. Cl. X.R.

23—1, 102, 142, 143, 158, 312; 75—1